(12) United States Patent
Satou

(10) Patent No.: US 7,034,505 B2
(45) Date of Patent: Apr. 25, 2006

(54) CHARGING SYSTEM

(75) Inventor: Masanobu Satou, Kodaira (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 11/067,343

(22) Filed: Feb. 24, 2005

(65) Prior Publication Data

US 2005/0189917 A1 Sep. 1, 2005

(30) Foreign Application Priority Data

Feb. 27, 2004 (JP) ............................ 2004-054418

(51) Int. Cl.
*H02J 7/00* (2006.01)
(52) U.S. Cl. ..................................... 320/132
(58) Field of Classification Search ............... 320/132, 320/107, 111, 112, 114, 115; 455/90.1
See application file for complete search history.

(56) References Cited

U.S. PATENT DOCUMENTS 6,583,601 B1 * 6/2003 Simoes et al. ............. 320/114
6,957,048 B1 * 10/2005 Formenti .................. 455/90.1

FOREIGN PATENT DOCUMENTS

JP 2002171327 * 6/2002
JP 2003338873 * 11/2003

* cited by examiner

*Primary Examiner*—Pia Tibbits
(74) *Attorney, Agent, or Firm*—Frishauf, Holtz, Goodman & Chick, P.C.

(57) ABSTRACT

A mobile apparatus is provided with a first charging circuit, and a charging device is provided with a second charging circuit. The charging device charges a secondary buttery of the mobile apparatus through three pairs of terminals, that is, the first input/output terminals of DC voltage, second input/output terminals of a charging voltage, and third input/output terminals connected to ground. With this arrangement, an effective charging operation is executed with minimum loss. Since the secondary buttery is charged only when the mobile apparatus is installed on the charging device and a power switch of the mobile apparatus is turned off, data stored in the mobile apparatus can be protected against destruction and the secondary buttery can be charged in safety.

8 Claims, 8 Drawing Sheets

CHARGING SYSTEM

FIELD OF THE INVENTION

The present invention relates to a charging system for charging a secondary buttery provided in a mobile apparatus.

BACKGROUND OF THE INVENTION

Conventionally, a charging system is used, in which a secondary buttery of a hand-held apparatus is charged by a cradle (charging device) when the hand-held apparatus is installed onto the cradle. As such charging system, there has been proposed two types of configurations. According to one configuration, a charge control circuit is provided in the cradle, and according to another, the charge control circuit is provided in the hand-held apparatus.

SUMMARY OF THE INVENTION

According to one aspect of the invention there is provided a charging system which comprises a first charging circuit which is provided in a mobile apparatus having a secondary buttery and a power-source circuit, and a second charging circuit which is provided in a charging device for supplying power to the first charging circuit, wherein the second charging circuit provided in the charging device comprises a first output terminal for outputting a DC voltage, a second output terminal for outputting a charging voltage for the secondary buttery of the mobile apparatus, a third terminal connected to ground; and a charge-control unit for causing the second terminal to output DC voltage as a charging voltage, and wherein the first charging circuit provided in the mobile apparatus comprises: a first input terminal for receiving the DC voltage when connected with the first output terminal of the second charging circuit, a second input terminal for receiving the charging voltage when connected with the second output terminal of the second charging circuit, a third input terminal to be connected to ground when connected with the third output terminal of the second charging circuit, a switching control unit for switching a power supply source to the power-source circuit of the mobile apparatus from the secondary buttery to the first input terminal to apply the charging voltage received by the second input terminal to the secondary buttery, when the mobile apparatus is installed on the charging device, a detecting unit for detecting whether or not the mobile apparatus has been installed on the charging device, a power-source control unit for generating and applying a power-source control signal to the power-source circuit of the mobile apparatus based on the resultant of detection by the detecting unit, a charge-control signal generating unit for generating a charge-control signal based on the resultant detection by the detecting unit and the power-source control signal generated by the power-source control unit, and a conduction switching unit for making conduction between the second input terminal and the secondary buttery of the mobile apparatus based on the charge-control signal generated by the charge-control signal generating unit. Further, according to another aspect of the invention, there is provided a charging system which comprises a first charging circuit which is provided in a mobile apparatus having a secondary buttery and a power-source circuit, and a second charging circuit which is provided in a charging device for supplying power to the first charging circuit, wherein the second charging circuit provided in the charging device comprises a first output terminal for outputting a DC voltage; a second output terminal for outputting a charging voltage for the secondary buttery of the mobile apparatus, a third terminal connected to ground, and a charge-control unit for causing the second terminal to output DC voltage as a charging voltage, and wherein the first charging circuit provided in the mobile apparatus comprises a first input terminal for receiving the DC voltage when connected with the first output terminal of the second charging circuit, a second input terminal for receiving the charging voltage when connected with the second output terminal of the second charging circuit, a third input terminal to be connected to ground when connected with the third output terminal of the second charging circuit, a switching control unit for switching a power supply source to the power-source circuit of the mobile apparatus from the secondary buttery to the first input terminal to apply the charging voltage received by the second input terminal to the secondary buttery, when the mobile apparatus is installed on the charging device, a detecting unit for detecting whether or not the mobile apparatus has been installed on the charging device, a power-source control unit for generating and applying a power-source control signal to the power-source circuit of the mobile apparatus based on the resultant of detection by the detecting unit, and for generating a charge-control signal based on on/off state of the power of the mobile apparatus, and a conduction switching unit for making conduction between the second input terminal and the secondary buttery of the mobile apparatus based on the charge-control signal generated by the charge-control signal generating unit.

DETAILED DESCRIPTION OF THE INVENTION

Now, preferred embodiments of a charging system for a camera according to the present invention will be described in detail with reference to the accompanying drawings.

Figure 1:
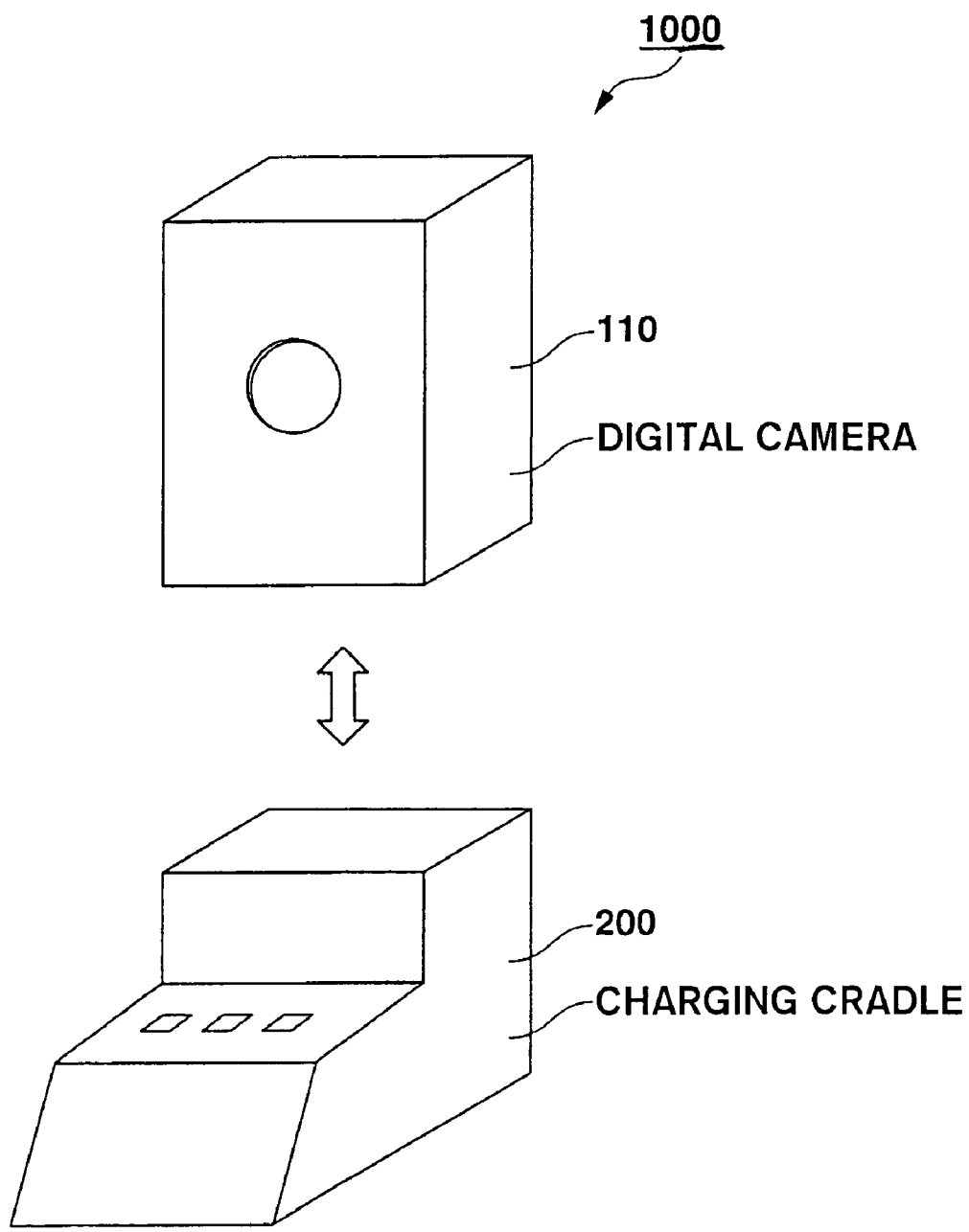
FIG. 1 is a view illustrating a structure of a charging system 1000 for a camera (camera charging system) according to a first embodiment of the present invention.
Figure 2:
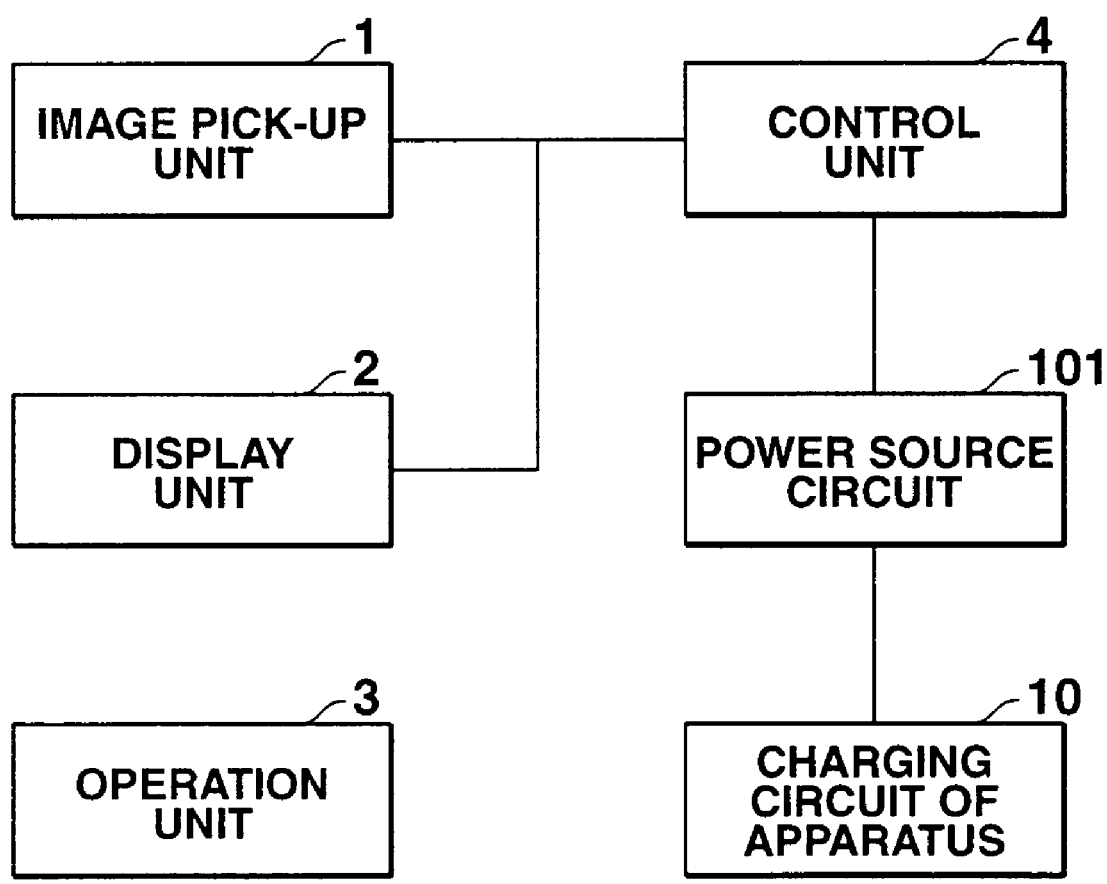
FIG. 2 is a block diagram showing a configuration of a digital camera 110.
Figure 3:
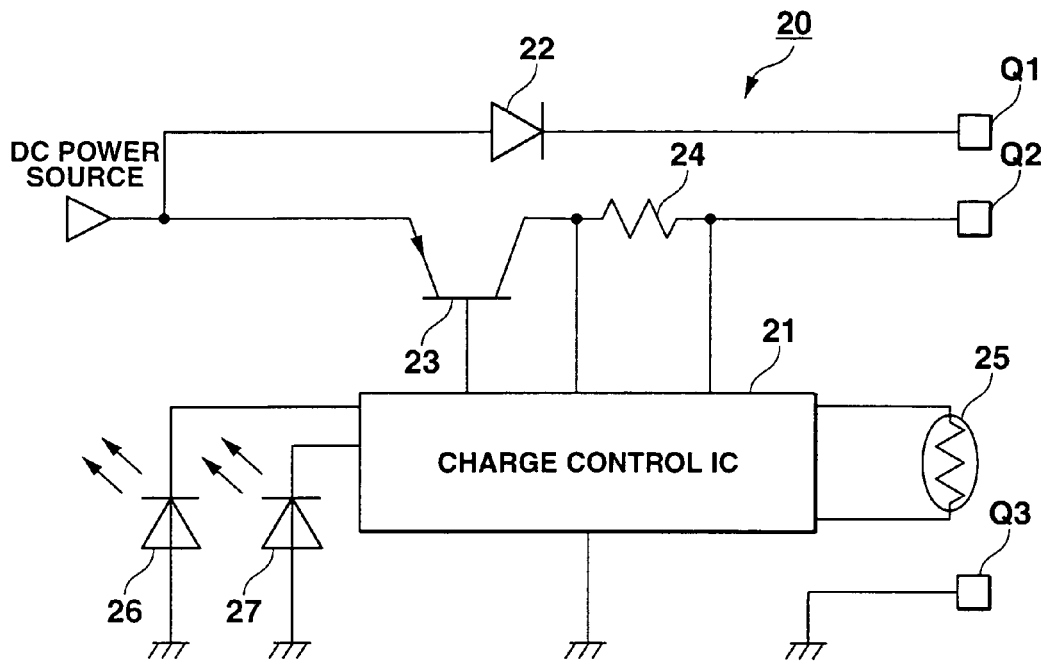
FIG. 3 is a view showing a circuit configuration of a charging circuit 20 in a charging device.

FIGS. 1 through 3 are views showing the charging system for a camera (camera charging system) used commonly in the embodiments of the invention.

FIG. 1 is a view showing a structure of a camera charging system 1000 according to the embodiment of the present invention. FIG. 2 is a block diagram showing a configuration of a digital camera 110. FIG. 3 is a view showing a charging circuit 20 in a charging device.

Each embodiment of the present invention comprises a modified circuit of the charging circuit of an apparatus (shown in FIG. 2) in the camera charging system.

First Embodiment

Figure 4:
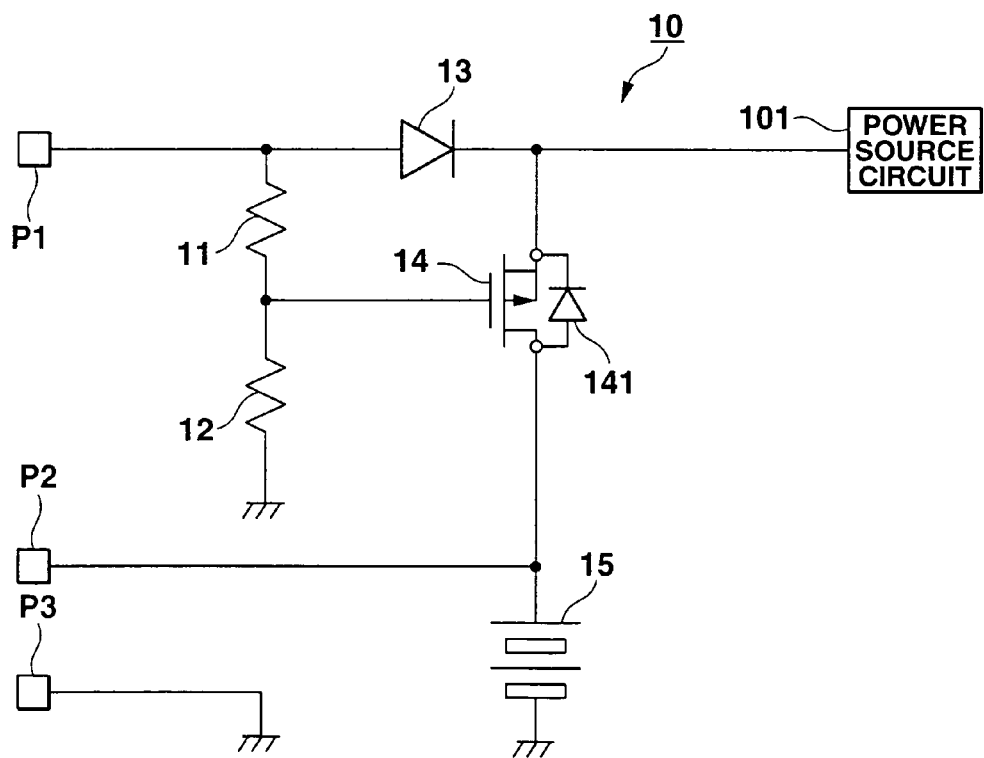
FIG. 4 is a view showing a circuit configuration of a charging circuit 10 of an apparatus.

The first embodiment of the present invention will be described with reference to FIGS. 1 through 4. FIGS. 1 through 3 are views showing the configuration of the camera charging system. FIG. 4 is a view showing a circuit configuration of the charging circuit 10 of an apparatus.

As shown in FIG. 1, the camera charging system 1000 according to the embodiment of the present invention, which serves as a charging system, comprises the digital camera 110 as a mobile apparatus and a charging device (cradle) 200 for charging the secondary buttery of the digital camera 110.

In the present embodiment of the invention, the digital (still) camera 110 is described as the mobile device. But the mobile device is not limited to the digital camera 100, but any device which uses at least a secondary battery and can be charged by a charging device may be used as the mobile device in the embodiments. A digital movie camera, PDA (Personal Digital Assistant), a cellular phone, PHS (Personal Handy-phone System), HT (Handy Terminal), a portable audio/video player/recorder (MD, cassette, CD, DVD (Digital Versatile Disk), a large capacity recording medium using a blue laser, a semiconductor memory), a portable game machine, a portable HDD (hard disk drive), a car navigation apparatus and the like are used as the mobile devices in the present embodiment. This is the same for other embodiments.

As shown in FIG. 2, the digital camera 110 comprises an image pick-up section 1 including CCD (Charge Coupled Device), a display section 2 such as LCD (Liquid Crystal Display) and an organic EL (Electro Luminescent) display, for displaying various screens, an operation section 3 which is operated by a user, and a control section 4 such as a main micro computer for controlling the sections in the camera 110. Further, digital camera 110 has a power source circuit 101 for supplying power to the image pick-up section, display section, operation section and controlling section, and the charging circuit 10 of an apparatus, serving as the first charging circuit.

As shown in FIG. 4, the charging circuit 10 of an apparatus has three terminals P1, P2, and P3 serving as the first, second and third input terminal, and a switching control section including resistors 11 and 12, a diode 13, and FET (Field Effect Transistor) 14, and a secondary battery 15.

A series connection of the resistors 11 and 12 is connected between the terminal P1 and ground (GND). It is assumed that the resistors 11 and 12 have resistances of R1 and R2, respectively and that it is true that the resistance R2 is sufficiently higher than the resistance R1. The diode 13 is connected between the terminal P1 and the power source circuit 101 in the forward direction from the terminal P1 to the power source circuit 101. The secondary battery 15 is connected between the terminal P2 and GND. It is assumed that a voltage drop across the diode 13 is Vf1.

FET 14 is of a P-channel type. FET 14 has a gate electrode connected to a connection point of the resistors 11 and 12, a drain electrode connected to the terminal P2, and a source electrode connected to the power source circuit 101. The FET 14 includes a parasitic diode 141 connected in the forward direction from the terminal P2 to the power source circuit 101. It is assumed that a voltage drop across the parasitic diode 141 is Vf2. The terminal P3 is connected to GND.

The charging device 200 is provided with a charging circuit 20 in a charging device, which serves as the second charging circuit. As shown in FIG. 3, the charging circuit 20 in a charging device comprises the first, second and third output terminals Q1, Q2 and Q3, which are connected to the terminals P1, P2, and P3, respectively, a charge control section including a charge control IC 21, diode 22, transistor 23 and resistor 24, and a thermistor 25 serving as a temperature detecting section, and LEDs 26, 27 (Light Emitting Diode) serving as a notifying section. There is also provided a DC power source (for example, combination of the commercial AC power source and AD converter for converting a power supply from the AC power source, and AC adopter).

The diode 22 is provided between DC power source and the terminal Q1 in the forward direction from DC power source to the terminal Q1. The transistor 23 has the emitter connected to the DC power source, the collector connected to the terminal Q2 through the resistor 24, and the base connected to the charge control IC 21. The both ends of the resistor 24 are connected to the charge control IC 21.

The thermistor 25 detects a temperature of the charging device 200 and the digital camera 110. The terminal Q3 is connected to GND. LEDs 26, 27 are connected in parallel between the charge control IC 21 and GND. The charge control IC 21 reads a current value flowing through the resistor 24 and receives a temperature signal for the thermistor 25, and on-off controls a base voltage of the transistor 23 in accordance with the voltage drop across the resistor 24 and the temperature signal to adjust a current (charging current) supplied from DC power source to the terminal Q2. The charge control IC 21 can control the LEDs 26 and 27 separately to turn on the same.

Now, a charging operation by the camera charging system 1000 will be described. The charging operation performed while the digital camera 110 is installed in the charging device 200 (first charging operation to be performed while camera is installed on charging device) and the charging operation performed while the digital camera 110 is uninstalled from the charging device 200 (first charging operation to be performed while camera is uninstalled from charging device) will be described separately.

First Charging Operation to be Performed While Camera is Installed on Charging Device:

When the digital camera 110 is installed on the charging device 200, the terminals P1, P2 and P3 in FIG. 4 are connected with the terminals Q1, Q2 and Q3 in FIG. 3, respectively, and then a DC voltage is applied to the terminal P1 through the diode 22 and the terminal Q1.

A voltage equivalent to DC voltage reduced by the voltage drop Vf1 across the diode 13 is applied to the source electrode of FET 14. Since it is true that the resistance R1 is sufficiently lower than the resistance R2, the source voltage becomes lower than the gate voltage, bringing FET 14 to an off state. Since FET 14 is made off, the terminal P2 is connected to the secondary battery 15.

At this time, since DC voltage is applied to the power source circuit 101 through the diode 13 in the charging circuit 10 of an apparatus, the power source is continuously supplied to the digital camera 110 without power interruption, even though the digital camera is installed on the charging device 200 while the digital camera is in operation. Further, the digital camera can be made on or off, while the digital camera 110 is installed on the charging device 200.

The terminal P2 is connected to the positive terminal of the secondary buttery 15 in the digital camera 110, and the charge control IC 21 makes the transistor 23 on, and current of charging (charging current) is monitored by measuring the voltage drop across the resistor 24, and is supplied to the secondary buttery 15 through the terminal Q2. At this time, the charge control IC 21 turns on LED 26, informing the user that the charging operation of the secondary butter 15 of the digital camera 11 has started. The charge control IC 21 can change the base voltage of FET 14 anytime.

When the charging current under monitor decreases to a value not more than a preset value, the charge control IC 21 determines that the secondary buttery 15 has been charged to the full, and turns on LED 27, informing that the secondary buttery 15 has been charged to the full. When the thermistor 25 detects an abnormal temperature, the charge control IC 21 makes the transistor 23 off, ceasing the charging operation.

First Charging Operation to be Performed While Camera is Uninstalled from Charging Device:

Operation to be performed while the digital camera 110 is uninstalled from the charging device 200 will be described. When the digital camera 110 is uninstalled from the charging device 200, a voltage equivalent to a supply voltage of the secondary buttery 15 reduced by a voltage drop Vf2 across the parasitic diode 141 is applied to the power source circuit 101. Since the terminal P1 is open at this time, and the gate electrode of FET 14 is grounded via the resistor 12 (FIG. 4), FET 14 goes on. When FET 14 is turned on, the power source voltage of the secondary battery 15 of the digital camera 110 is supplied to the power source circuit 101.

In the present embodiment, an arrangement using the thermistor 25 has been described, but the temperature detecting unit is not limited to the thermometer and another temperature detecting unit such as a platinum thermometer (platinum temperature resistor) may be used in place of the thermistor 25. Further, two LEDs 26, 27 are used in the embodiment to inform the charging state, but an audio outputting unit may be used to inform the charging state. Single or not less than three units of informing unit for informing the charging state may be used. These are the same for other embodiments to be described hereafter.

Second Embodiment

Figure 5:
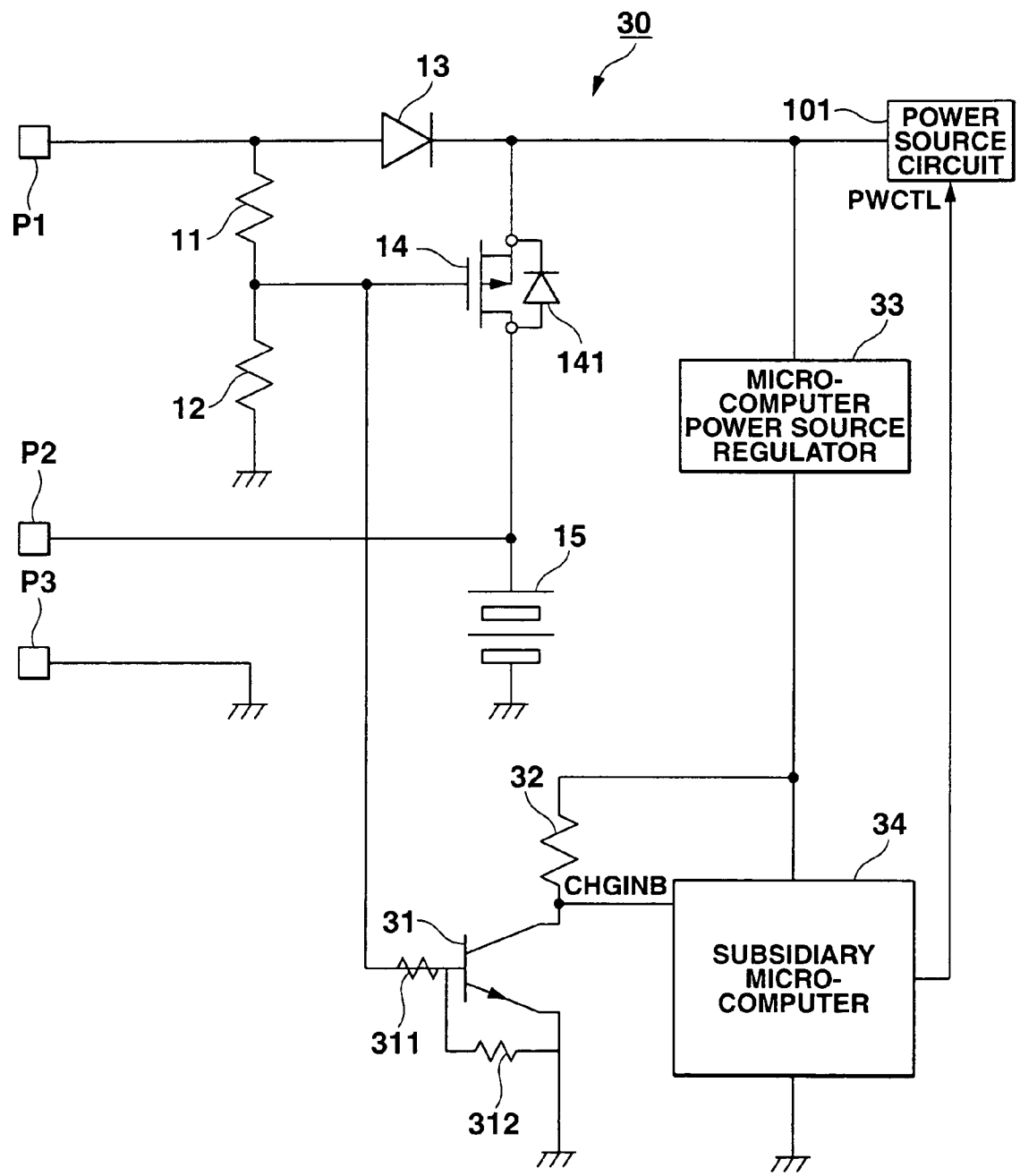
FIG. 5 is a view showing a circuit configuration of a charging circuit 30 of an apparatus.

A second embodiment of the invention will be described with reference to FIG. 5. FIG. 5 is a view illustrating a circuit configuration of a charging circuit 30 of an apparatus.

A camera charging system according to the present second embodiment of the invention comprises a digital camera 120 and the same charging device as the charging device 200 of the first embodiment. The digital camera 120 (not shown) has the substantially same configuration as the digital camera 110 in the first embodiment, and comprises an image pick-up unit, display unit, operation unit, control unit and the same power source circuit as the power source circuit 101 of the first embodiment. The digital camera 120 further comprises the charging circuit 30 of an apparatus shown in FIG. 5, in place of the charging circuit 10 of an apparatus (shown in FIG. 4) in the first embodiment.

As shown in FIG. 5, the charging circuit 30 of an apparatus comprises a detecting unit including a digital transistor 31, resistor 32 and a micro-computer power source regulator 33, and a power source control unit including a subsidiary micro-computer 34 in addition to the elements of the charging circuit 10 of an apparatus.

The base electrode of the digital transistor 31 is connected through a resister 311 to the connecting point between the resistor 11 and the gate electrode of FET 14. The emitter electrode of the digital transistor 31 is connected to GND and also to the base electrode through a resistor 312. The collector electrode of the digital transistor 31 is connected to the subsidiary micro-computer 34 and to the micro-computer power source regulator 33 through a resistor 32. It is assumed that the collector of the digital transistor is supplied with a signal CHGINB, which is previously pulled up to a high side by the subsidiary micro-computer 34.

The micro-computer power source regulator 33 serves to adjust the power source voltage to be supplied to the subsidiary micro-computer 34. The micro-computer power source regulator 33 is connected to a connecting point between the source electrode of FET 14 and the diode 13 to be supplied with the power source voltage, and adjusts the supplied power source voltage to apply the adjusted voltage to the subsidiary micro-computer 34.

The subsidiary micro-computer 34 is grounded and outputs a power-source control signal (signal PWCTL) to the power source circuit 101. The power-source control signal (signal PWCTL) is used in the power source circuit 101 to control the power source.

The charging operation in the camera charging system of the present embodiment will be described similarly to in the first embodiment, that is, the charging operation performed while the digital camera 120 is installed in the charging device 200 (second charging operation to be performed while camera is installed on charging device) and the charging operation performed while the digital camera 120 is uninstalled from the charging device 200 (second charging operation to be performed while camera is uninstalled from charging device) will be described separately.

Second Charging Operation to be Performed While Camera is Installed on Charging Device:

When the digital camera 120 is installed on the charging device 200, FET 14 in the charging circuit 30 of an apparatus (FIG. 5) is turned off and a voltage equivalent to a DC voltage at the terminal P1 reduced by a voltage drop Vf1 across the diode 13 is applied to the power source circuit 101 in the same way as in the first charging operation performed while installed on charging device. Even though the digital camera 120 in operation is installed on the charging device 200, the voltage equivalent to a DC voltage at the terminal P1 reduced by a voltage drop Vf1 is continuously supplied to the power source circuit 101 without power interruption.

Simultaneously, since DC voltage at the terminal P1 is applied to the base electrode of the digital transistor 31 through the resistors 11 and 311, the digital transistor 31 goes on and the collector voltage (signal, CHGINB) to the digital transistor 31 is changed for a high level to a low level. The signal, CHGINB serves as a detection signal of detecting connection between the digital camera 120 and the charging device 200.

Receiving DC voltage supplied from the terminal P1 through the micro-computer power source regulator 33, the subsidiary micro-computer 34 works at all times. The subsidiary micro-computer 34 monitors the signal CHGINB and makes a power-source control signal PWCTL off when the digital camera is connected to the charging device 200. When the power-source control signal PWCTL is made off, the power source of the digital camera 120 is turned off, whereby the display unit, image pick-up unit and control unit connected to the power source circuit 101 are made off.

The terminal P2 connected to the positive terminal of the secondary buttery 15 and a charging operation of the secondary buttery 15 starts as in the same manner as in the first charging operation performed while installed in the charging device. During the charging operation, the subsidiary microcomputer 34 monitors the signal CHGINB at all times even though the power source of the digital camera 120 is turned off. Therefore, even when the power switch of the digital camera is turned on while the digital camera 120 is charged by the charging device 200, the digital camera 120 is not made active. The above mentioned arrangement allows a charging current to be supplied to the secondary charging buttery 15 in a normal state.

In the same manner as in the first charging operation while installed on the device, the secondary buttery 15 is charged from the terminal P2, while the charging control IC 21 monitors the full charge of the secondary buttery 15 and an abnormal temperature detected by the thermister 25.

Second Charging Operation to be Performed While Camera is Uninstalled from Charging Device:

Charging operation to be performed while the digital camera 120 is uninstalled from the charging device 200 will be described. When the digital camera 120 is uninstalled from the charging device 200, a voltage equivalent to the supply voltage of the secondary buttery 15 reduced by a voltage drop Vf2 across the parasitic diode 141 is supplied to the power source circuit 101, and FET 14 is turned on.

Simultaneously, the base electrode of the digital transistor 31 is connected to ground, turning the digital transistor 31 off. When the digital transistor 31 is turned off, the signal CHGINB changes from a low level to a high level, whereby the subsidiary micro-computer 34 determines that the digital camera 120 is uninstalled from the charging device 200.

A power source voltage of the secondary buttery 15 of the digital camera 120 is applied to the power source circuit 101 in the same manner as in the first charging operation performed while uninstalled from the charging device. The digital camera 120 returns to its normal state, and is normally activated by turning on the power source by a user.

In the second embodiment, when the signal PWCTL is made off, the control unit, image pick-up unit, display unit connected to the power source circuit 101 are also turned off. The arrangement is not limited to the mentioned above, but may be modified such that, for example, when the signal PWCTL is made off, a part of the display unit and operation unit is kept in operation. This will be also applied to a fifth and seventh embodiment.

In the present second embodiment of the invention, an arrangement may be changed such that the subsidiary micro-computer 34 is connected to the power switch of the operation unit, and the signal PWCTL is made on or off in response to on/off operation of the power switch. This arrangement may be applied to the fifth and seventh embodiment.

Third Embodiment

Figure 6:
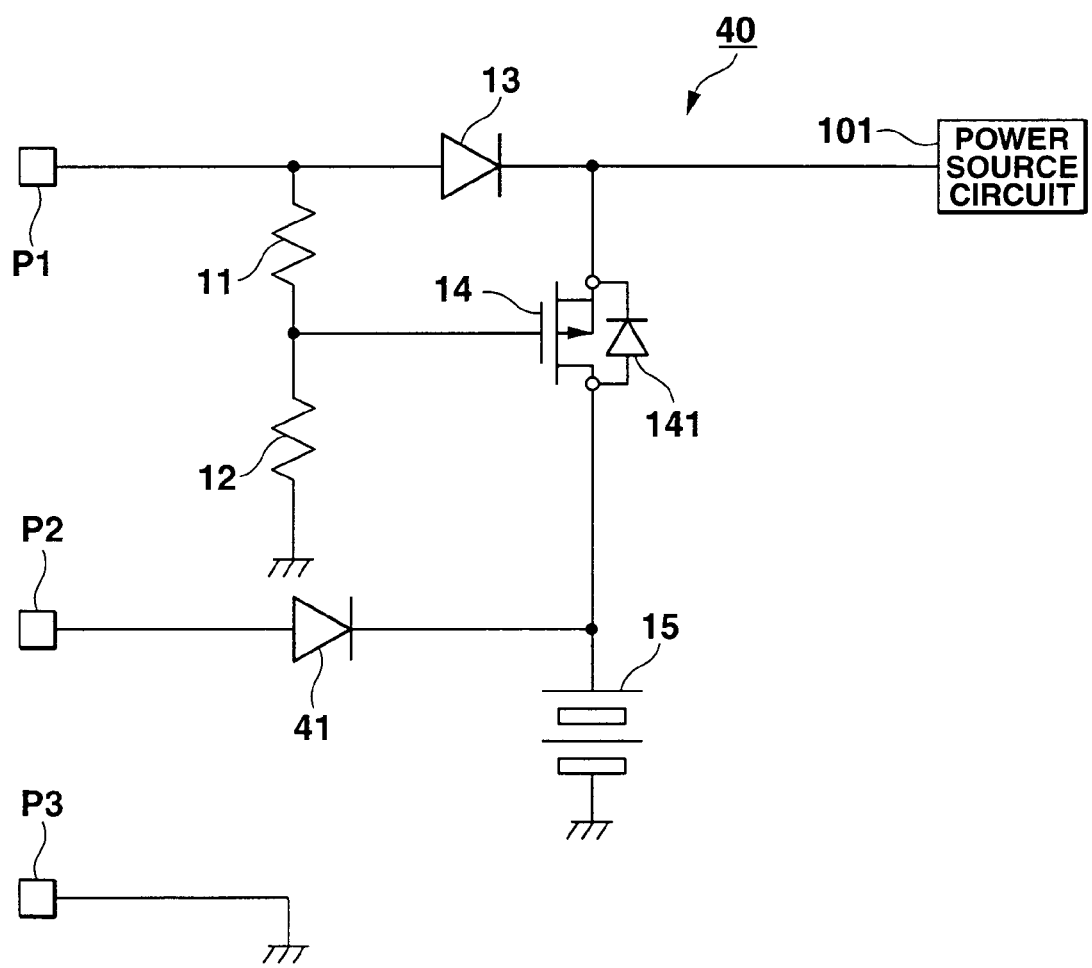
FIG. 6 is a view showing a circuit configuration of a charging circuit 40 of an apparatus.
Figure 7:
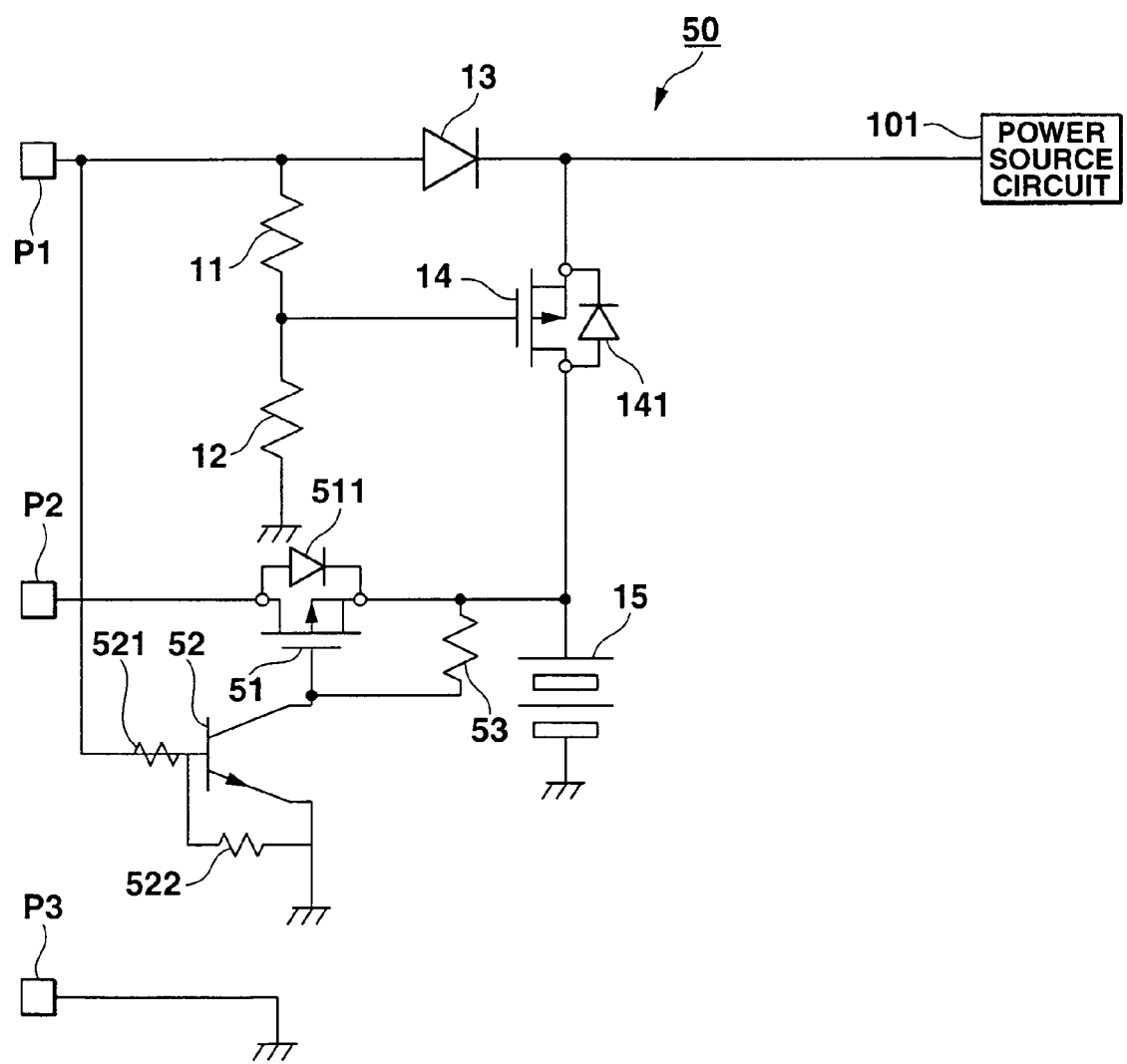
FIG. 7 is a view showing a circuit configuration of a charging circuit 50 of an apparatus.

A third embodiment of the present invention will be described with reference to FIG. 6. FIG. 6 is a view illustrating a circuit configuration of a charging circuit 40 of an apparatus. A camera charging system according to the present third embodiment of the invention comprises a digital camera 130 and the same charging device as the charging device 200 of the first embodiment. The digital camera 130 (not shown) has the substantially same configuration as the digital camera 110 of the first embodiment, and comprises an image pick-up unit, display unit, operation unit, control unit and the same power source circuit as the power source circuit 101 of the first embodiment. The digital camera 130 further comprises the charging circuit 40 of an apparatus shown in FIG. 6, in place of the charging circuit 10 of an apparatus (shown in FIG. 4) in the first embodiment. Further, the digital camera 130 comprises the charging circuit 40 of an apparatus shown in FIG. 6 in place of the charging circuit 10 (shown in FIG. of an apparatus in the first embodiment.

Since the terminals P1, P2 and P3 are exposed on an external surface of the digital camera 130, there is a fear that they can be shunted due to some causes. For this reason, the charging circuit 40 of an apparatus has a function of preventing a short circuit between the terminals P1 and P2 or a short circuit in the secondary buttery 15. The charging circuit 40 of an apparatus further comprises a diode 41 serving as a rectifier. The diode 41 is connected between the terminal P2 and the secondary battery 15 in a forward direction from the terminal P2 to the secondary battery 15.

Similarly to in the first embodiment, a third charging operation performed in the charging system camera while the digital camera is installed on the charging device and a third charging operation while the digital camera is uninstalled from the charging device will be described separately.

Third Charging Operation to be Performed While the Camera is Installed on Charging Device:

When the digital camera 130 is installed on the charging device 200, FET 14 is turned off in the charging circuit 40 of an apparatus, and the power source circuit 101 is supplied with a voltage equivalent to DC voltage at the terminal P1 reduced by a voltage drop Vf1 across the diode 13 in the same way as in the first charging operation performed while the camera is installed on the charging device. In this case, even if the digital camera 130 in operation is installed on the charging device 200, a voltage equivalent to DC voltage reduced by the voltage drop Vf1 is applied to the power source circuit 101 without power interruption.

The terminal P2 is connected to the positive terminal of the secondary buttery 15, and charging operation starts, charging the secondary buttery 15 from the terminal P2 through the diode 41 in the same manner as in the first charging operation performed while the camera is installed on the charging device. Further, in the same manner as in the first charging operation performed while installed on the device, the secondary buttery 15 is charged from the terminal P2, while the charging control IC 21 monitors the full charge of the secondary buttery 15 and an abnormal temperature detected by the thermister 25.

Third Charging Operation to be Performed While Camera is Uninstalled from the Charging Device:

Charging operation to be performed while the digital camera 130 is uninstalled from the charging device 200 will be described. When the digital camera 130 is removed from the charging device 200, a voltage equivalent to the supply voltage of the secondary buttery 15 reduced by a voltage drop Vf2 across the parasitic diode 141 is applied to the power source circuit 101, and FET 14 goes on in the same way as in the first charging operation performed while the camera is installed on the charging device.

A voltage of the secondary buttery 15 in the digital camera 130 is supplied to the power source circuit 101 in the same manner as in the first charging operation performed while the camera is installed on the charging device. The diode 41 prevents a voltage of the secondary buttery 15 from appearing at the terminal P2.

Fourth Embodiment

A fourth embodiment of the present invention will be described with reference to FIG. 6. FIG. 6 is a view showing a circuit configuration of a charging circuit 50 of an apparatus.

A camera charging system according to the present fourth embodiment of the invention comprises a digital camera 140 and the same charging device as the charging device 200 of the first embodiment. The digital camera 140 (not shown) has the substantially same configuration as the digital camera 110 of the first embodiment, and comprises an image pick-up unit, display unit, operation unit, control unit and the same power source circuit as the power source circuit 101 of the first embodiment. The digital camera 140 further comprises the charging circuit 50 of an apparatus shown in FIG. 5, in place of the charging circuit 10 of an apparatus (shown in FIG. 4) in the first embodiment.

In the charging circuit 40 according to the third embodiment of the invention, there is a fear that a voltage at the terminal P2 becomes a little low to charge the secondary buttery 15 due to the voltage drop Vf3 across the diode 41. The charging circuit 50 of an apparatus has a function of preventing the charging voltage at the terminal P2 from going low. The charging circuit 50 of an apparatus comprises a switcher or FET 51, digital transistor 52 and resistor 53 in addition to the elements of the charging circuit 10.

FET 51 is a P-channel type transistor. The gate electrode of the FET 51 is connected to the positive terminal of the secondary buttery 15, and the drain electrode is connected to the terminal P2 and the source electrode to the positive terminal of the secondary buttery 15. FET 15 includes a parasitic diode 511 connected in a forward direction from the terminal P2 to the positive terminal of the secondary buttery 15.

The digital transistor 52 has the base electrode connected to the terminal P1 through a resistor 521 and the collector electrode connected to the gate electrode of FET 51. The emitter electrode of the digital transistor 52 is connected to grounded and also to the base electrode through a resistor 522.

Similarly to in the first embodiment, a fourth charging operation performed in the camera charging system 1000 while the digital camera is installed on the charging device and a fourth charging operation performed while the digital camera is uninstalled from the charging device will be described separately.

Fourth Charging Operation to be Performed While the Camera is Installed on the Charging Device:

When the digital camera 140 is installed on the charging device 200, FET 14 is turned off in the charging circuit 50 of an apparatus, and the power source circuit 101 is supplied with a voltage equivalent to DC voltage at the terminal P1 reduced by a voltage drop Vf1 across the diode 13 in the same way as in the first charging operation performed while the camera is installed on the charging device.

When DC voltage at the terminal P1 is applied to the base electrode of the digital transistor 52 through the resistor 521, the digital transistor 52 goes on. When the digital transistor 52 is turned on, the gate voltage of FET 51 is grounded and goes low, turning FET 51 on. At this time, even though the digital camera 140 in operation is installed on the charging device 200, a voltage equivalent to DC voltage reduced by the voltage drop Vf1 is applied to the power source circuit 101 without power interruption in the same manner as in the first charging operation performed while the camera is installed one the charging device.

Since the terminal P2 is connected to the positive terminal of the secondary buttery 15 and FET 51 is turned on, charging operation starts, charging the secondary buttery 15 from the terminal P2 through FET 51, in the same manner as in the first charging operation performed while the camera is installed on the charging device. The secondary buttery 15 is charged from the terminal P2 while the charge control IC 21 monitors the full charge of the secondary buttery 15 and an abnormal temperature detected by the thermister 25, as in the same manner as in the first charging operation performed while the camera is installed on the charging device.

Fourth Charging Operation to be Performed While the Camera is Uninstalled from the Charging Device:

Operation to be performed while the digital camera 140 is uninstalled from the charging device 200 will be described. When the digital camera 140 is removed from the charging device 200, a voltage equivalent to the supply voltage of the secondary buttery 15 reduced by the voltage drop Vf2 across the parasitic diode 141 is applied to the power source circuit 101, in the same manner as in the first charging operation performed while the camera is uninstalled from the charging device, and FET 14 goes on.

Since the terminal P1 is in an open state and no DC voltage is applied to the base electrode of the digital transistor 52, the digital transistor 52 remains off. Further, since the gate and source voltage are kept equivalent, FET 51 remains off. As a result, the power source voltage is applied to the power source circuit 101 from the secondary battery 15 of the digital camera 140 in the same manner as in the first charging operation performed while the camera is uninstalled from the charging device. But since FET 51 remains off, the buttery voltage of the secondary butter 15 does not appear at the terminal P2.

Fifth Embodiment

Figure 8:
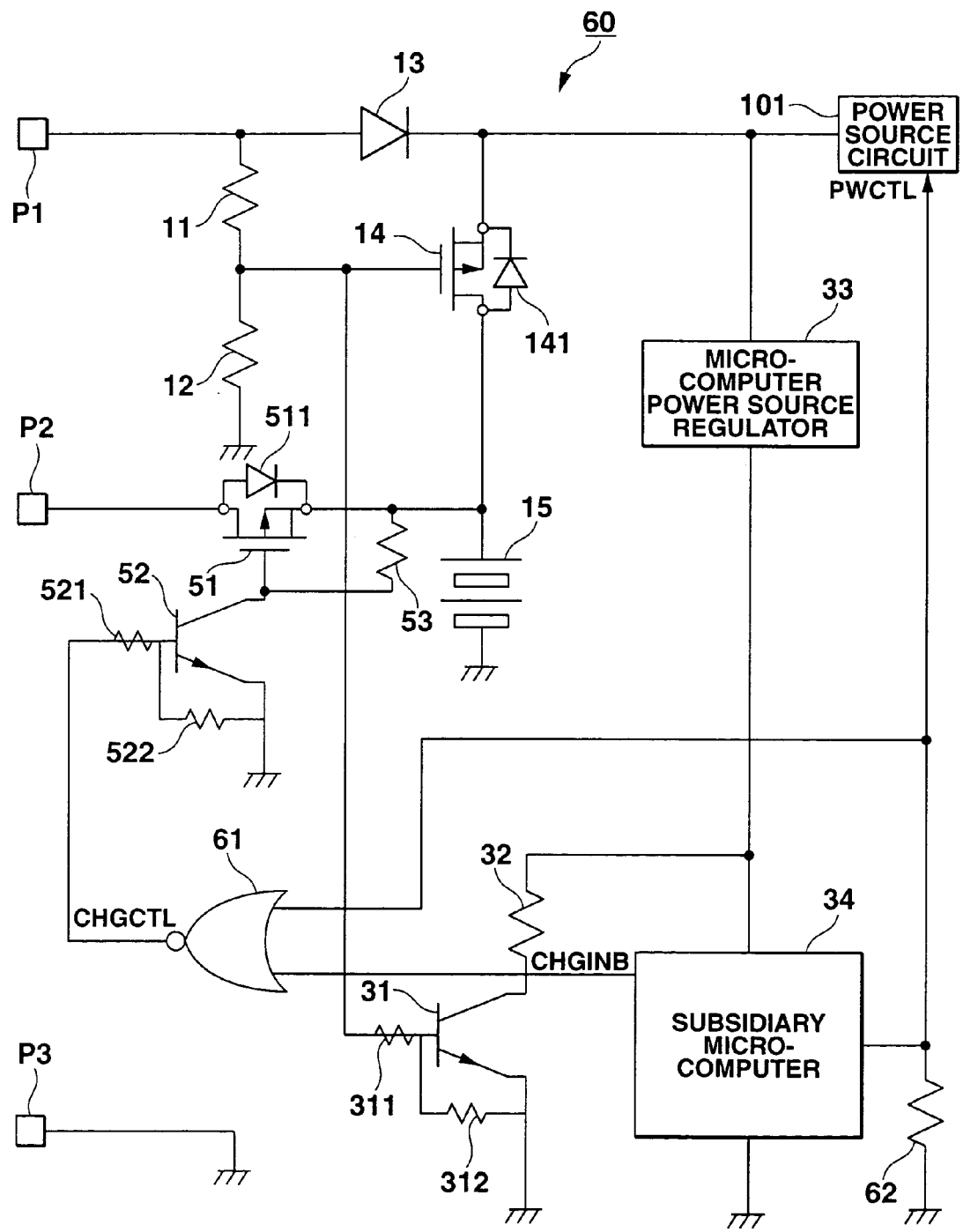
FIG. 8 is a view showing a circuit configuration of a charging circuit 60 of an apparatus.

A fifth embodiment of the present invention will be described with reference to FIG. 8. FIG. 8 is a view showing a circuit configuration of a charging circuit 60 of an apparatus.

A camera charging system according to the present fifth embodiment of the invention comprises a digital camera 150 and the same charging device as the charging device 200 of the first embodiment. The digital camera 150 (not shown) has the substantially same configuration as the digital camera 110 of the first embodiment, and comprises an image pick-up unit, display unit, operation unit, control unit and the power source circuit 101 of the first embodiment. The digital camera 150 further comprises the charging circuit 30 of an apparatus shown in FIG. 5, in place of the charging circuit 10 of an apparatus (shown in FIG. 4) in the first embodiment. Further, the digital camera 150 comprises the charging circuit 60 of an apparatus shown in FIG. 8 in place of the charging circuit 10 of an apparatus (shown in FIG. 4) in the first embodiment. As shown in FIG. 8, the charging circuit 60 of an apparatus comprises a digital transistor 31, a resistor 32, the micro-computer power source regulator 33, the subsidiary micro-computer 34, FET 51, a digital transistor 52, NOR circuit 61 serving as a charge-control signal generator, and a resistor 61 in addition to the elements of the charging circuit 10 of an apparatus.

The transistor 31, resistor 32, the micro-computer power source regulator 33, and the subsidiary micro-computer 34 are connected in the same way as in the charging circuit 30 of an apparatus of the second embodiment. The subsidiary micro-computer 34 has an output terminal (output terminal of a power-sour control signal PWCTL) which is connected to ground through the resistor 62, and further to the power source circuit 101 and one terminal of NOR circuit 61. The collector electrode (output terminal of a signal CHGINB) of the digital transistor 31 is connected to the other terminal of NOR circuit 61.

FET 51, the digital transistor 52, and resistor 53 are connected in the same manner as in the charging circuit 50 of an apparatus in the fourth embodiment. But the base electrode of the digital transistor 52 is connected to an output terminal of NOR circuit 61 through a resistor 521. A signal CHGCTL is output from the NOR circuit 61.

Similarly to in the first embodiment, a fifth charging operation performed in the camera charging system while the digital camera is installed on the charging device and a fifth charging operation performed while the digital camera is uninstalled from the charging device.

Fifth Charging Operation Performed While Camera is Installed on Charging Device:

When the digital camera 150 is installed on the charging device 200, FET 14 is turned off in the charging circuit 60 of an apparatus, and the power source circuit 101 is supplied with a voltage equivalent to DC voltage at the terminal P1 reduced by a voltage drop Vf1 across the diode 13 in the same way as in the first charging operation performed while the camera is installed on the charging device.

Simultaneously, the digital transistor 31 is turned on and the collector voltage (signal CHGINB) of the transistor 31 goes to a low level form a high level. Mnitoring signal CHGINB, the subsidiary micro-computer 34 outputs a signal PWCTL of a low level in response to installation of the camera on the charging device 200.

Receiving the signal CHGINB of a low level and signal PWCTL of a low level at its input terminals, NOR circuit 61 outputs a signal CHGCTL of a high level, which is input to the base electrode of the digital transistor 52. Then, the transistor 2 is turned on, bringing FET 51 on in the same manner as in the fourth operation performed while the camera is installed on the charging device. At this time, even if the digital camera 150 in operation is installed on the charging device 200, a voltage equivalent to DC voltage reduced by the voltage drop Vf1 is applied to the power source circuit 101 without power interruption in the same manner as in the first operation performed while the camera is installed on the charging device. The terminal P2 is connected to the positive terminal of the secondary buttery 15, and since the FET 51 is turned on, charging operation starts for charging the secondary buttery 15 from the terminal P2 through FET 51, in the same manner as in the first charging operation performed while the camera is installed on the charging device. Further, in the same manner as in the first charging operation performed while installed on the device, the secondary buttery 15 is charged from the terminal P2, while the charging control IC 21 monitors the full charge of the secondary buttery 15 and an abnormal temperature detected by the thermister 25.

NOR circuit 61 outputs a signal CHGCTL of a high level to carge the secondary buttery 15, only when the signals CHGINB and PWCTL are low, that is, when the digital camera 150 is installed on the charging device 200 and when the power of the digital camera is turned off.

Fifth Charging Operation to be Performed While Camera is Uninstalled from Charging Device:

Operation to be performed while the digital camera 150 is uninstalled from the charging device 200 will be described. When the digital camera 150 is removed from the charging device 200, a voltage equivalent to the supply voltage of the secondary buttery 15 reduced by the voltage drop Vf2 across the parasitic diode 141 is applied to the power source circuit 101, and FET 14 goes on, in the same manner as in the first charging operation performed while the camera is uninstalled from the charging device.

Simultaneously, the digital transistor 31 is turned off, and the signal CHGINB changes from a low level to a high level, whereby the subsidiary micro-computer 34 determines that the digital camera 150 has been uninstalled from the charging device 200 in the same manner as in the operation performed while the camera is uninstalled from the charging device. Then, the output signal CHGCTL of NOR circuit 61 goes low, bringing the base voltage of the digital transistor 52 to a low level, turning the transistor 52 off, and also turning FET 51 off, in the same manner as in the fourth operation performed while the camera is uninstalled from the charging device.

As a result, the power source voltage is applied to the power source circuit 101 from the secondary battery 15 of the digital camera 150 in the same manner as in the first charging operation performed while the camera is uninstalled from the charging device. But since FET 51 remains off, the buttery voltage of the secondary butter 15 does not appear at the terminal P2.

Sixth Embodiment

Figure 9:
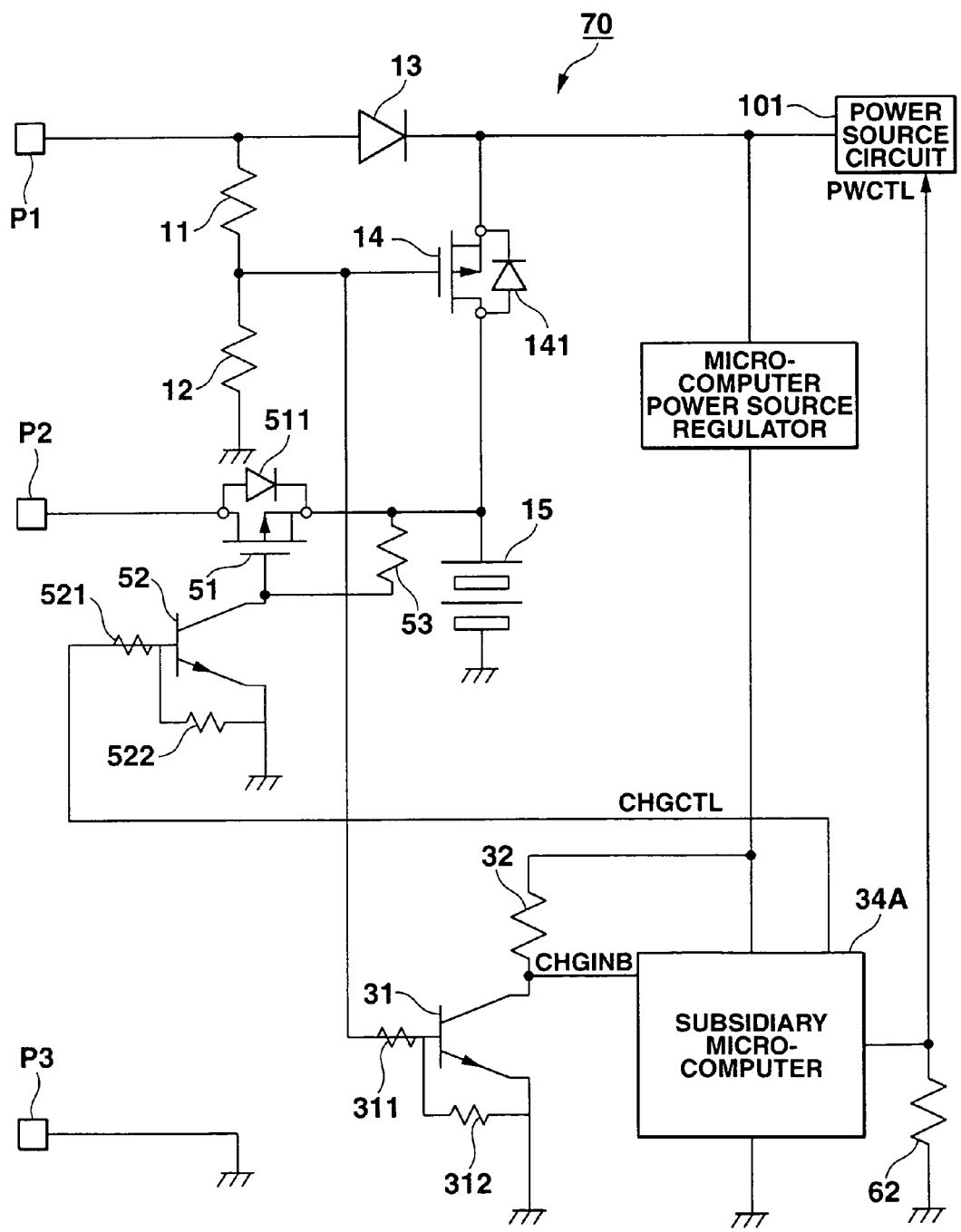
FIG. 9 is a view showing a circuit configuration of a charging circuit 70 of an apparatus.

A sixth embodiment of the present invention will be described with reference to FIG. 9. FIG. 9 is a view showing a circuit configuration of a charging circuit 70 of an apparatus.

A camera charging system according to the present sixth embodiment of the invention comprises a digital camera 160 and the same charging device as the charging device 200 of the first embodiment. The digital camera 160 (not shown) has the substantially same configuration as the digital camera 110 of the first embodiment, and comprises an image pick-up unit, display unit, operation unit, control unit and the same power source as the power source circuit 101 of the first embodiment. The digital camera 160 further comprises the charging circuit 70 of an apparatus shown in FIG. 9, in place of the charging circuit 10 of an apparatus (shown in FIG. 4) in the first embodiment.

As shown in FIG. 9, the charging circuit 70 of an apparatus comprises a digital transistor 31, a resistor 32, the micro-computer power source regulator 33, the subsidiary micro-computer 34A, FET 51, a digital transistor 52, and resistors 53 and 62 in addition to the elements of the charging circuit 10 of an apparatus.

The digital transistor 31, resistor 32, micro-computer power source regulator 33, and subsidiary micro-computer 34A are connected in the same way as the digital transistor 31, resistor 32, micro-computer power source regulator 33, and subsidiary micro-computer 34 included in the charging circuit 30 of an apparatus of the second embodiment. The FET 51, digital transistor 52, and resistors 53 are connected in the same manner as those in the charging circuit 50 in an apparatus of the fourth embodiment. The output terminal (power source control signal PWCTL) of the subsidiary micro-computer 34A is connected to ground through the resistor 62 and also to the power source circuit 101. The subsidiary micro-computer 34A outputs a voltage signal CHGCTL to the base electrode of the digital transistor 52 through a resistor 521 for controlling timing of charging of the secondary buttery 15. The subsidiary micro-computer 34A is also connected to the power switch of the operation unit.

Sixth operation performed while the camera is installed on the charging device in the present camera charging system, and sixth operation performed while the camera is uninstalled from the charging device will be described separately in the same manner as in the first embodiment.

Sixth Charging Operation to be Performed While Camera is Installed on Charging Device:

When the digital camera 160 is installed on the charging device 200, FET 14 is turned off in the charging circuit 70 of an apparatus, and the power source circuit 101 is supplied with a voltage equivalent to DC voltage at the terminal P1 reduced by a voltage drop Vf1 across the diode 13 in the same way as in the first charging operation performed while the camera is installed on the charging device.

Simultaneously, the digital transistor 31 is turned on and the collector voltage (signal CHGINB) of the transistor 31 goes to a low level form a high level. The subsidiary micro-computer 34A monitors the signal CHGINB. When it is determined that the signal CHGINB is low and the power source of the digital camera 160 is on, bringing the camera 160 in operation, the subsidiary micro-computer 34A outputs the signal PWCTL of a low level, whereby the digital transistor 52 is not turned on, and also FET 51 is not turned on. As a result, the secondary buttery 15 is not charged.

When the signal CHGINB is low and the power is turned off, bringing the digital camera 160 out of operation, the subsidiary micro-computer 34A outputs the power-source control signal PWCTL of a low level, and thereafter outputs the signal CHGCTL of a high level. When the signal CHGCTL of a high level is input to the base electrode of the digital transistor 52, the digital transistor 52 is turned on, making FET 51 on in the same manner as in the fourth charging operation while the camera is installed on the charging device. At this time, even if the digital camera 160 in operation is installed on the charging device 200, a voltage equivalent to DC voltage reduced by voltage drop Vf1 is applied to the power source circuit 101 without power interruption in the same manner as in the first charging operation performed while the camera is installed on the charging device.

Since the terminal P2 is connected to the positive terminal of the secondary buttery 15 and FET 51 is turned on, the charging operation starts to charge the secondary buttery 15 from the terminal P2 through FET 51, in the same manner as in the first charging operation performed while the camera is installed on the charging device. The secondary buttery 15 is charged from the terminal P2 while the charge control IC 21 monitors the full charge of the secondary buttery 15 and an abnormal temperature detected by the thermister 25, as in the same manner as in the first charging operation performed while the camera is installed on the charging device.

When the user turns on the power switch of the digital camera 160 while the camera is installed on the charging device 200, the subsidiary micro-computer 34A detects that the power switch of the digital camera 160 has been turned on, and makes the signal CHGCTL low, ceasing the charging operation of the secondary buttery 15. Further, the subsidiary micro-computer 34A makes the signal PWCTL high, allowing the user to turn on the digital camera 160.

Sixth Charging Operation to be Performed While the Camera is Uninstalled from the Charging Device:

Operation to be performed while the digital camera 160 is uninstalled from the charging device 200 will be described. When the digital camera 160 is removed from the charging device 200, a voltage equivalent to the supply voltage of the secondary buttery 15 reduced by the voltage drop Vf2 across the parasitic diode 141 is applied to the power source circuit 101, in the same manner as in the first charging operation performed while the camera is uninstalled from the charging device, and FET 14 goes on.

Simultaneously, the base electrode of the digital transistor 31 is connected to ground, and the digital transistor 31 is turned off. When the digital transistor 31 is turned off, the signal CHGINB changes from a low level to a high level, whereby the subsidiary micro-computer 34A monitors or judges that the digital camera 160 has been uninstalled from the charging device 200. Then, the subsidiary micro-computer 34A makes the base voltage of the digital transistor 52 low, turning the same transistor 52 off, whereby FET 51 is turned off in the same manner as in the fourth operation performed while the camera is uninstalled from the charging device.

As a result, the power source voltage is applied to the power source circuit 101 from the secondary battery 15 of the digital camera 160 in the same manner as in the first charging operation performed while the camera is uninstalled from the charging device. But since FET 51 remains off, the buttery voltage of the secondary butter 15 does not appear at the terminal P2. Note that the detailed configuration and operation of the elements included in the camera charging systems of the above mentioned embodiments may be changed within the spirit and scope of the present invention.

What is claimed is:

1. A charging system comprising:
a first charging circuit which is provided in a mobile apparatus having a secondary buttery and a power-source circuit, and a second charging circuit which is provided in a charging device for supplying power to the first charging circuit, wherein the second charging circuit provided in the charging device comprises:
a first output terminal for outputting a DC voltage;
a second output terminal for outputting a charging voltage for the secondary buttery of the mobile apparatus;
a third terminal connected to ground; and
a charge-control unit for causing the second terminal to output DC voltage as a charging voltage, and wherein the first charging circuit provided in the mobile apparatus comprises:
a first input terminal for receiving the DC voltage when connected with the first output terminal of the second charging circuit;
a second input terminal for receiving the charging voltage when connected with the second output terminal of the second charging circuit;
a third input terminal to be connected to ground when connected with the third output terminal of the second charging circuit;
a switching control unit for switching a power supply source to the power-source circuit of the mobile apparatus from the secondary buttery to the first input terminal to apply the charging voltage received by the second input terminal to the secondary buttery, when the mobile apparatus is installed on the charging device;
a detecting unit for detecting whether or not the mobile apparatus has been installed on the charging device;
a power-source control unit for generating and applying a power-source control signal to the power-source circuit of the mobile apparatus based on the resultant of detection by the detecting unit;
a charge-control signal generating unit for generating a charge-control signal based on the resultant detection by the detecting unit and the power-source control signal generated by the power-source control unit; and
a conduction switching unit for making conduction between the second input terminal and the secondary buttery of the mobile apparatus based on the charge-control signal generated by the charge-control signal generating unit.

2. The charging system according to claim 1, wherein the first charging circuit provided in the mobile apparatus comprises a rectifying unit provided in the forward direction from the second input terminal to the secondary buttery of the mobile apparatus.

3. The charging system according to claim 1, wherein the second charging circuit provided in the charging device comprises a temperature detecting unit for detecting a temperature of the charging device, wherein when the temperature detecting unit detects an abnormal temperature of the charging device, the charge-control unit ceases output of the charging voltage to the second output terminal.

4. The charging system according to claim 1, wherein the second charging circuit provided in the charging device comprises a notifying unit, wherein the charge-control unit makes the notifying unit notify a state of the charging voltage output to the second output terminal.

5. A charging system comprising:
  a first charging circuit which is provided in a mobile apparatus having a secondary buttery and a power-source circuit, and
  a second charging circuit which is provided in a charging device for supplying power to the first charging circuit, wherein the second charging circuit provided in the charging device comprises:
  a first output terminal for outputting a DC voltage;
  a second output terminal for outputting a charging voltage for the secondary buttery of the mobile apparatus;
  a third terminal connected to ground; and
  a charge-control unit for causing the second terminal to output DC voltage as a charging voltage, and wherein the first charging circuit provided in the mobile apparatus comprises:
  a first input terminal for receiving the DC voltage when connected with the first output terminal of the second charging circuit;
  a second input terminal for receiving the charging voltage when connected with the second output terminal of the second charging circuit;
  a third input terminal to be connected to ground when connected with the third output terminal of the second charging circuit;
  a switching control unit for switching a power supply source to the power-source circuit of the mobile apparatus from the secondary buttery to the first input terminal to apply the charging voltage received by the second input terminal to the secondary buttery, when the mobile apparatus is installed on the charging device;
  a detecting unit for detecting whether or not the mobile apparatus has been installed on the charging device;
  a power-source control unit for generating and applying a power-source control signal to the power-source circuit of the mobile apparatus based on the resultant of detection by the detecting unit, and for generating a charge-control signal based on on/off state of the power of the mobile apparatus; and
  a conduction switching unit for making conduction between the second input terminal and the secondary buttery of the mobile apparatus based on the charge-control signal generated by the charge-control signal generating unit.

6. The charging system according to claim 5, wherein the first charging circuit provided in the mobile apparatus comprises a rectifying unit provided in the forward direction from the second input terminal to the secondary buttery of the mobile apparatus.

7. The charging system according to claim 5, wherein the second charging circuit provided in the charging device comprises a temperature detecting unit for detecting a temperature of the charging device, wherein when the temperature detecting unit detects an abnormal temperature of the charging device, the charge-control unit ceases output of the charging voltage to the second output terminal.

8. The charging system according to claim 5, wherein the second charging circuit provided in the charging device comprises a notifying unit, wherein the charge-control unit makes the notifying unit notify a state of the charging voltage output to the second output terminal.

* * * * *